March 15, 1927. 1,621,236
J. W. CRUIKSHANK
APPARATUS FOR GRINDING PLANE SURFACES
Filed Dec. 29, 1923 3 Sheets-Sheet 1
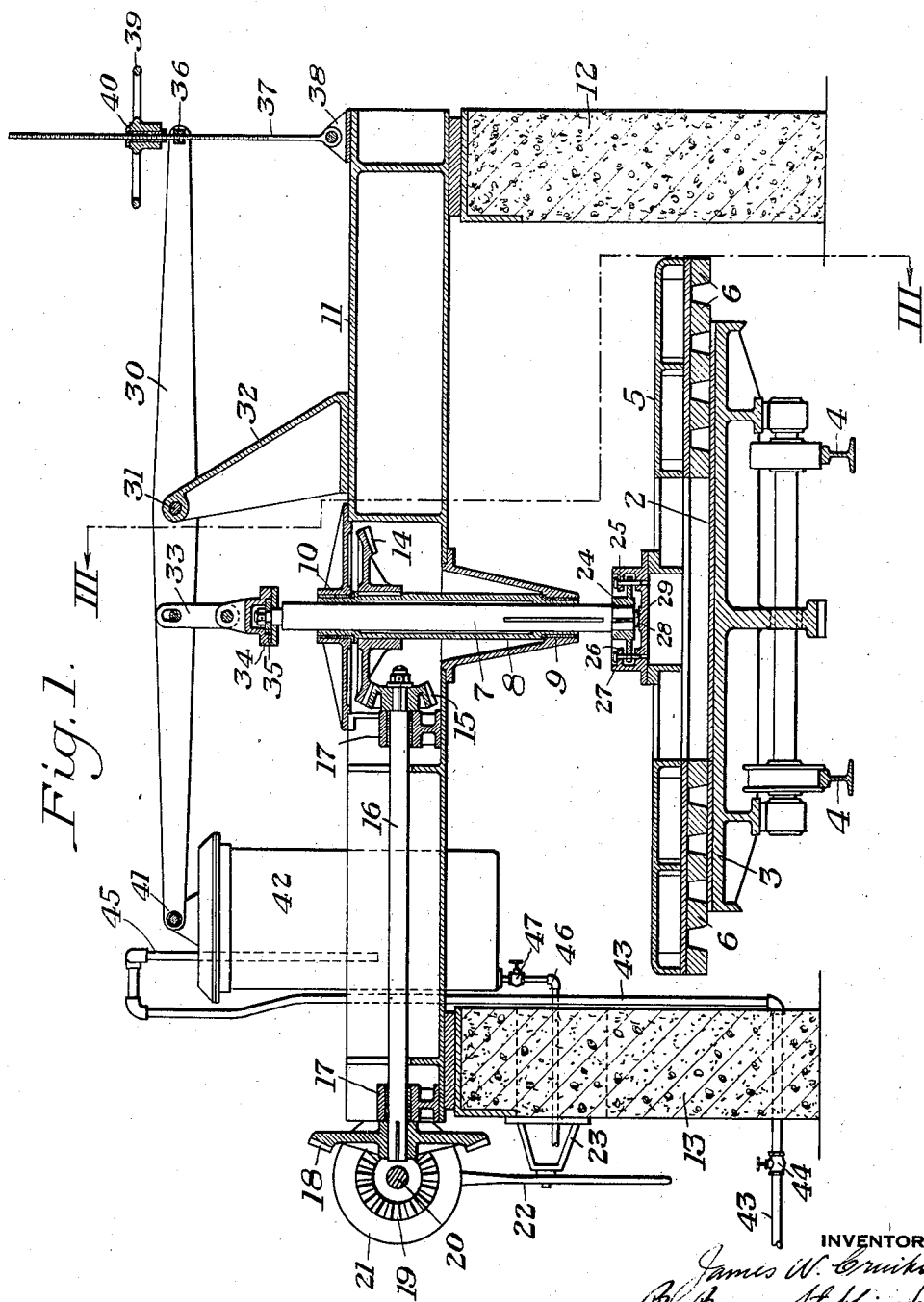

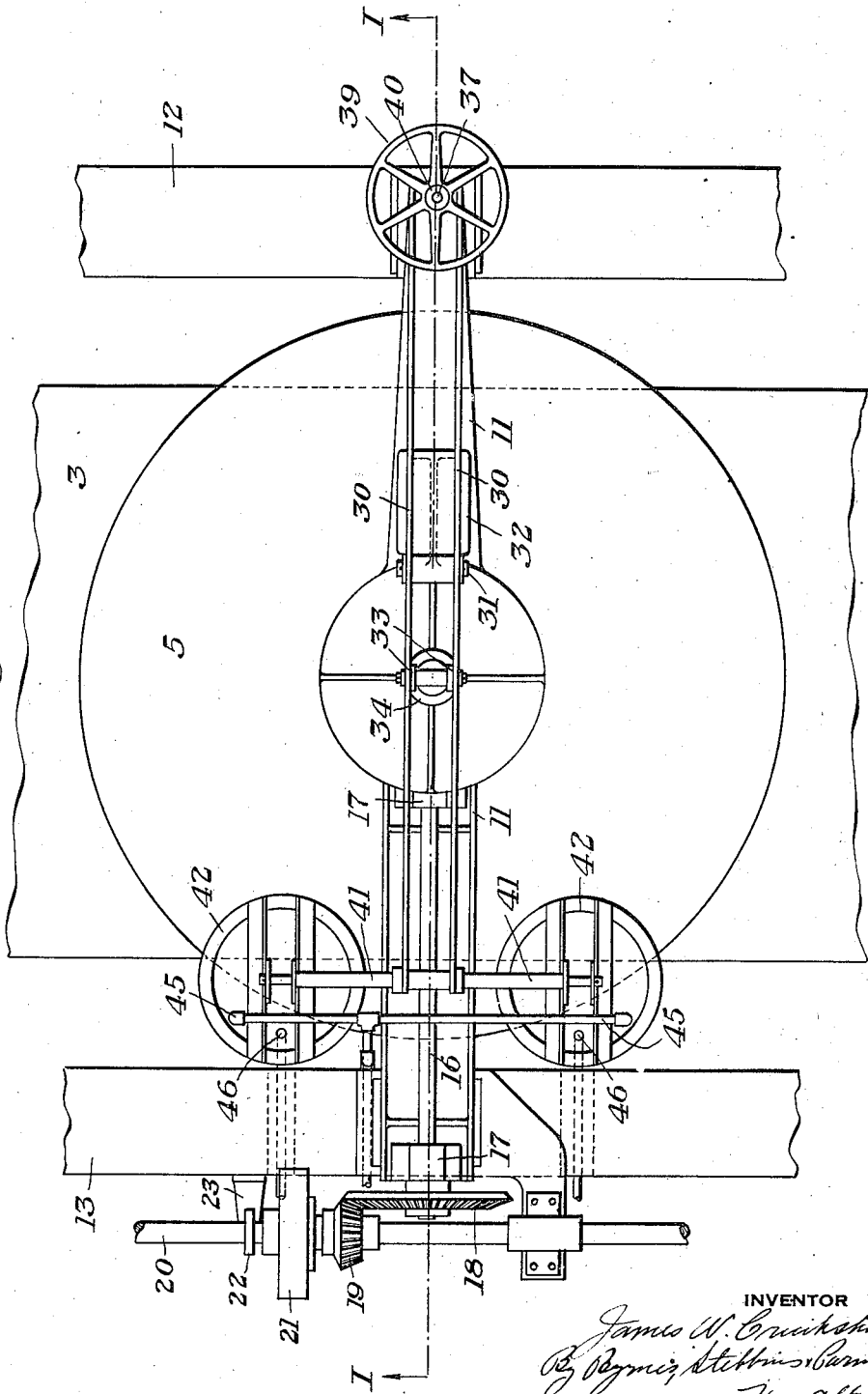

March 15, 1927. 1,621,236
J. W. CRUIKSHANK
APPARATUS FOR GRINDING PLANE SURFACES
Filed Dec. 29, 1923  3 Sheets-Sheet 3
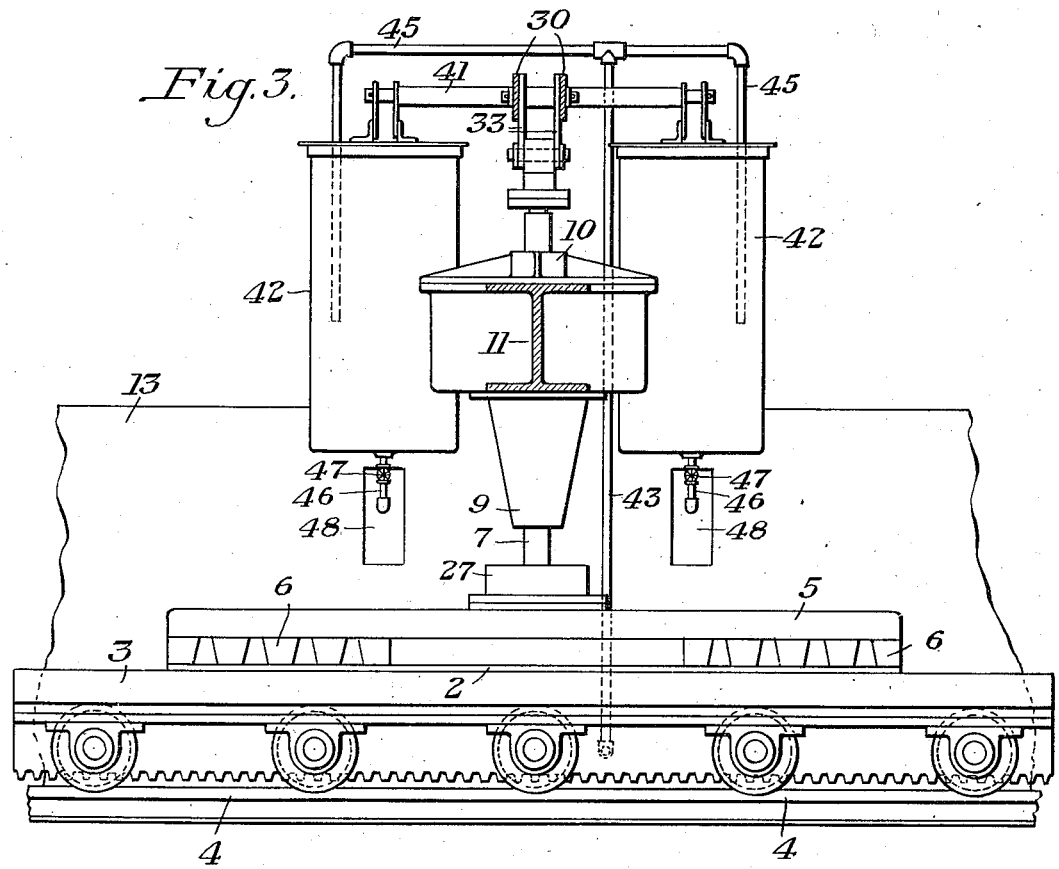
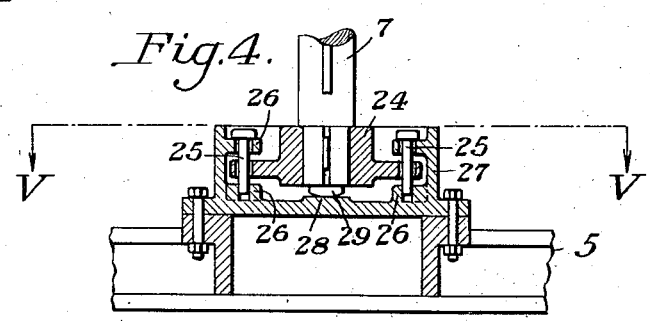
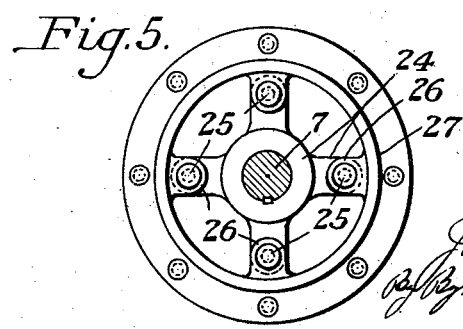
INVENTOR
James W. Cruikshank Patented Mar. 15, 1927.

1,621,236

UNITED STATES PATENT OFFICE.

JAMES W. CRUIKSHANK, OF PITTSBURGH, PENNSYLVANIA.

APPARATUS FOR GRINDING PLANE SURFACES.

Application filed December 29, 1923. Serial No. 683,353.

The present invention relates to apparatus for grinding plane surfaces, and more particularly to apparatus for grinding plate glass. In the usual form of apparatus for grinding plate glass, the glass is laid on a circular table and the grinding performed by runners mounted above the table and provided with iron shoes for the grinding, the runners being supplied with sand or other abrasive material. The table is placed in the grinding machine and is caused to revolve under the runners, the latter being supplied, first, with a coarse grade of sand, followed by successively finer grades of sand and finally with emery. With this method of grinding, the weight of the runners must be varied during the grinding operation, because the glass, when first laid, has a rough surface and often has lumps on it which, if the full weight of the runners were applied at the beginning of the operation, would cause breakage of the glass. The means usually employed for varying the pressure of the runners comprises a screw connected to a lever which engages the top of the runner shaft, so that the runners are suspended above the surface of the glass on the table. At the beginning of the grinding operation, the screw is so adjusted that the runner which it controls hardly touches the glass and as the grinding proceeds, the screw is adjusted from time to time so as to cause more and more of the weight of the runner to bear on the glass. An objection to this manner of adjusting the runner is that the runner must be made relatively heavy in order to bear on the glass with sufficient pressure when the full weight of the runner is allowed to come on the glass during the later stages of the grinding operation. With a heavy runner, there is always danger of the glass breaking by reason of the runner bearing too heavily upon the glass during the early stages of the grinding operation. Another objection to this manner of adjusting the runner is that, in order to increase the weight of the runner during the later stages of the grinding operation, and to compensate for the loss of weight due to the wearing away of the iron shoes, the runner must be made relatively heavy and counter-weighted and the weights removed as the shoes wear away. Thus the runner, when the shoes are new, has an excess weight. Furthermore, the vertical driving shaft of the runner has heretofore been rigidly secured to the runner, so that the runner was not enabled to adjust itself to inequalities in the surface of the glass being ground. This has also been a cause of the glass breaking during grinding.

By the present invention, I have provided a grinding apparatus in which a relatively light runner may be employed by reason of the provision of means for causing the runner to bear on the glass with any desired pressure, irrespective of the weight of the runner itself. Another feature of the invention is the provision of a flexible driving connection between the lower end of the vertical driving shaft and the runner, whereby the runner may be positively driven, but is adapted to automatically adjust itself to inequalities in the surface of the glass being ground. My improved grinding apparatus is particularly useful in a method of grinding such as disclosed in my co-pending application, Serial No. 669,679, filed October 29, 1923, wherein there is shown a series of grinder runners operating successively on the glass which is carried under the runners on tables propelled along a track over which the runners are positioned, each succeeding runner being supplied with a grade of sand which is finer than that supplied to the immediately preceding runner or runners. In such a method of grinding, all of the runners may be permanently adjusted, the first runner being adjusted so that it does not come into full contact with the glass, but is only adapted to grind off the rough places, or high spots, which may occur, and thus avoid breakage. The next runner of the series may have more pressure on the glass surface and the succeeding runners may bear, with the maximum pressure upon the glass during the whole of the grinding operation.

In the accompanying drawings, in which I have shown a preferred embodiment of my invention;

Figure 1 is a transverse sectional view of a grinding apparatus embodying my invention; the section being taken on the line I—I of Figure 2;

Figure 2 is a plan view of the grinding apparatus;

Figure 3 is a sectional view on the line III—III of Figure 1; and

Figures 4 and 5 are detail views of the flexible driving connection between the runner and its driving shaft, Figure 5 being a sectional view on the line V—V of Figure 4.

In the illustrative embodiment of the invention a glass sheet 2 is represented as carried upon a table 3 adapted to be propelled along a track 4 beneath the grinder runner 5. This runner carries the usual form of iron plating or shoes 6 for grinding the glass. The runner is adapted to be rotated in the usual manner through a vertical shaft 7 connected at its lower end to the runner and surrounded by a sleeve 8 which rotates in bearings 9 and 10. These bearings are carried by a transverse beam 11 supported at its opposite ends by masonry walls 12 and 13 at the sides of the track 4. The sleeve 8 carries a bevel gear 14 with which meshes a bevel pinion 15 mounted on the inner end of a shaft 16 journaled in bearings 17 carried by the beam 11. On its outer end the shaft 16 carries a bevel gear 18 with which meshes a bevel pinion 19 mounted loosely on the main driving shaft 20, which is adapted to drive a series of runners and which may be driven by any suitable means; such as an electric motor. A friction clutch 21 is provided for operatively connecting the pinion 19 to the shaft 20, the clutch being operated by a clutch lever 22 pivoted upon a bracket 23 carried by the masonry wall 13. The lower end of the shaft 7, instead of being rigidly connected to the runner as is customary, is flexibly connected thereto by means comprising a spider 24 keyed upon the lower reduced end of the shaft. Pins 25 extend through openings in the arms of the spider and through spaced lugs 26 integral with a ring casting 27 which is bolted to the runner. This ring casting is provided with a seat 28, on which the lower rounded end 29 of the shaft rests. It will be noted that the openings in the arms of the spider, through which the pins 25 extend, are somewhat larger in diameter than the diameter of the pins. This flexible connection between the lower end of the shaft 7 allows the runner to adjust itself to inequalities in the surface of the glass, while at the same time being positively rotated by the shaft.

The shaft 7 is keyed to the sleeve 8 so as to be positively driven thereby, but is adapted to slide vertically in the sleeve. Two parallel bars 30 forming a lever are mounted on a fulcrum pin 31 carried by a standard 32 mounted on the beam 11. A link 33 connects this lever to a suspension bearing 34 which engages a collar 35 mounted upon the upper end of the shaft 7. The two bars 30 which constitute the lever are connected at one end by a cross piece 36 through an opening in which a vertical screw extends. This screw is pivoted at its lower end to a bracket 38 mounted on the beam 11 and is provided above the cross piece 36 with a hand-wheel 39 having a nut 40 mounted in its hub for engagement with the screw. The two bars 30 are connected at their opposite end by a cross bar 41, from the ends of which are suspended two counterweight tanks 42. These tanks are adapted to be filled with water supplied through a pipe 43 controlled by a valve 44 and having two branch pipes 45 extending into the tanks through the upper ends thereof. A drain pipe 46 is connected to the bottom of each tank and controlled by a valve 47, these valves being accessible through openings in the wall 13.

It will be apparent that with the above construction, the runner itself may be made relatively light so as to avoid breakage of the glass and that it may be caused to bear upon the glass with any desired pressure in accordance with the amount of water in the tanks 42. The pressure of the runner on the glass may be very accurately adjusted and the desired pressure may be maintained irrespective of the wearing away of the iron shoes. The hand-wheel 39 affords means for relieving the pressure of the runner on the glass due to its own weight when this is desired.

In a method of grinding such as disclosed in my co-pending application above referred to, if it is desired to produce a greater pressure on some of the runners in the series than would be afforded by filling the tanks 42 with water, iron weights may be placed in the bottoms of the tanks. These weights will take up a relatively small space in the tanks and will not interfere with the adjustment of the pressure by supplying water to the tanks. Another way of adding weight to the runners would be to provide the bars 30 with a weight adapted to be moved along the bars. Also, in place of the screw 37 and hand-wheel 39 for reducing the pressure of the runner on the glass, counter-weights might be employed, these counter-weights being connected to the bars 30.

While I have disclosed a preferred embodiment of the invention, it will be understood that changes may be made in the details of construction shown without departing from the spirit of the invention or scope of the appended claims.

Among the advantages of the invention are: faster grinding due to the possibility of applying greater pressure on the glass than caused by the weight of the runner itself; reduction of breakage by having the runner of relatively light weight and flexibly connected to its driving shaft so as to enable the runner to adjust itself to inequalities in the surface of the glass; and the possibility of securing a fine adjustment of the pressure of the runner upon the glass and maintaining such pressure constant by reason of the fact that the loss of weight due to the wearing away of the iron shoes may be compensated for.

I claim:

1. In apparatus for grinding sheet glass, a runner, means for driving said runner comprising a vertically extending driving shaft, a lever extending at an angle to said shaft and fulcrumed intermediate its ends, a connection between the upper end of said shaft and said lever, means connected to said lever on the same side of its fulcrum as said connection for adding weight to said runner, and means connected to said lever on the other side of its fulcrum for reducing the pressure of the runner upon the surface being ground, substantially as described.

2. In apparatus for grinding sheet glass, a runner, means for driving said runner comprising a vertically extending shaft, a lever extending at an angle to said shaft, a connection between the upper end of said shaft and said lever, a tank suspended from said lever on the same side of its fulcrum as said connection, and means for supplying fluid to said tank, substantially as described.

3. In apparatus for grinding plane surfaces, a runner, means for driving said runner comprising a vertically extending shaft, a lever extending at an angle to said shaft, a connection between the upper end of said shaft and said lever, a cross arm carried by said lever on the same side of its fulcrum as said connection, a pair of tanks suspended from the opposite ends of said cross arm, and means for supplying fluid to each of said tanks, substantially as described.

4. Apparatus for grinding and polishing glass including a runner, a shaft for the runner, a driving gear splined on the shaft, a swivel bearing at the upper end of the shaft, a weight connected with the swivel for urging it down, and mechanism for adjustably varying the effect of the weight.

5. Apparatus for grinding and polishing a glass including a runner, a shaft for the runner, a driving gear splined on the shaft, a swivel bearing at the upper end of the shaft, a variable weight connected with the swivel for urging it down, and mechanism for adjustably varying the effect of the weight.

6. Apparatus for grinding and polishing glass including a runner, a shaft for the runner, a lost motion connection between the runner and the shaft, a driving gear splined on the shaft, a swivel for the top of the shaft, and a variable weight connected with the swivel for urging it down to apply pressure to the shaft.

7. Apparatus for grinding and polishing glass including a runner, a shaft for the runner, a swivel bearing at the upper end of the shaft, a lever on which the swivel is carried, variable means on the lever for urging the swivel down, and an adjustable fulcrum for the lever.

8. Apparatus for grinding and polishing glass including a runner, a shaft for the runner, a flexible connection between the shaft and the runner, driving means for the shaft, a swivel bearing at the upper end of the shaft, a lever above the swivel bearing, said swivel bearing being connected to the lever intermediate the ends thereof, an adjustable fulcrum at one end of the lever, and a weight at the other end of the lever.

In testimony whereof I have hereunto set my hand.

JAMES W. CRUIKSHANK.